Nov. 2, 1965   J. W. FOLLIN, JR., ETAL   3,215,368
DIRECTION COSINE LINKAGE
Filed Oct. 28, 1960   9 Sheets-Sheet 1

JAMES W. FOLLIN, Jr.
GEORGE C. MUNRO
INVENTORS

BY
ATTORNEYS

Nov. 2, 1965  J. W. FOLLIN, JR., ETAL  3,215,368
DIRECTION COSINE LINKAGE
Filed Oct. 28, 1960  9 Sheets-Sheet 2

JAMES W. FOLLIN, Jr.
GEORGE C. MUNRO
INVENTORS

BY
ATTORNEYS

Nov. 2, 1965

J. W. FOLLIN, JR., ETAL 3,215,368

DIRECTION COSINE LINKAGE

Filed Oct. 28, 1960

JAMES W. FOLLIN, Jr.
GEORGE C. MUNRO
INVENTORS

BY

ATTORNEYS

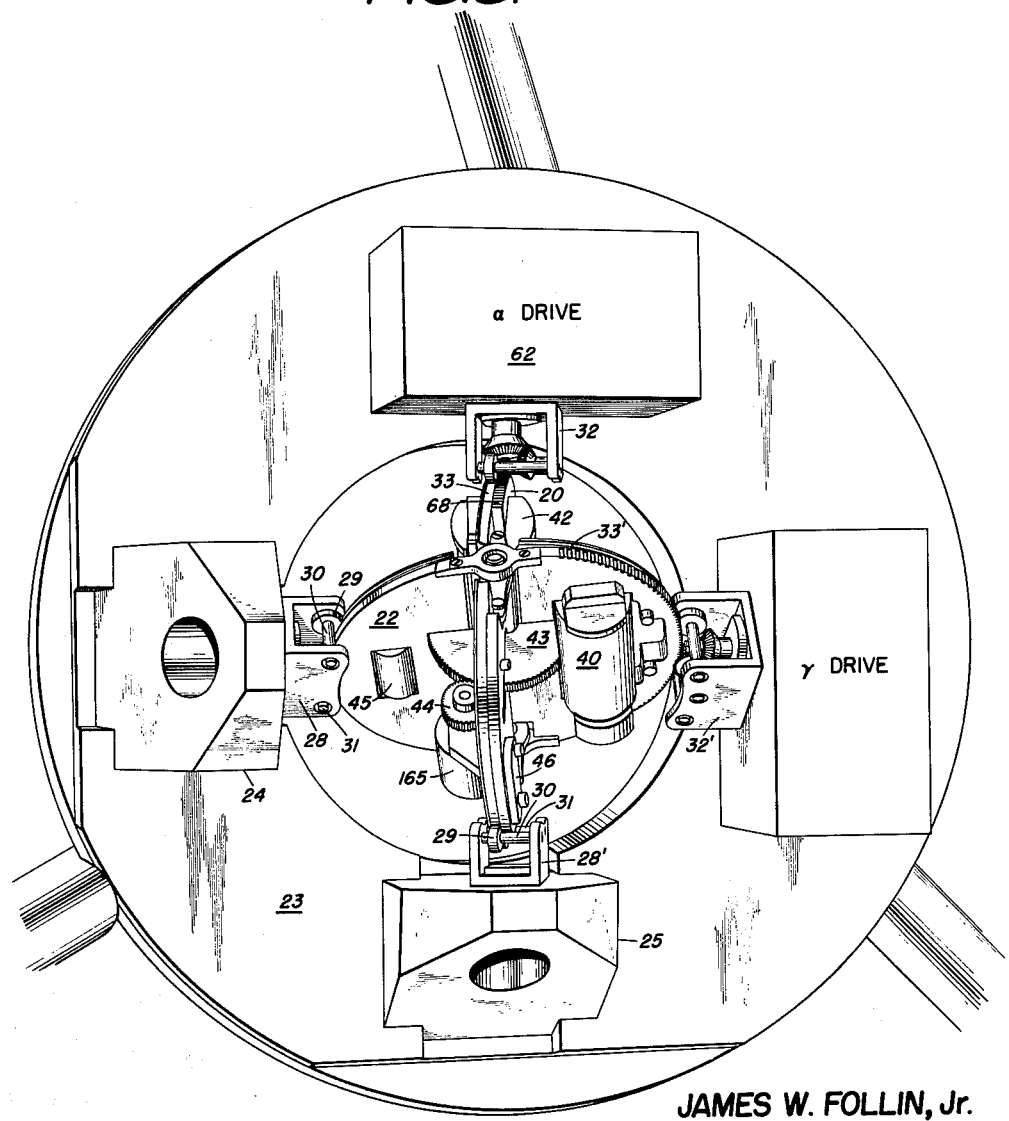

Nov. 2, 1965  J. W. FOLLIN, JR., ETAL  3,215,368
DIRECTION COSINE LINKAGE
Filed Oct. 28, 1960  9 Sheets-Sheet 5

INVENTORS
JAMES W. FOLLIN, Jr.
GEORGE C. MUNRO
BY
ATTORNEYS

Nov. 2, 1965   J. W. FOLLIN, JR., ETAL   3,215,368
DIRECTION COSINE LINKAGE
Filed Oct. 28, 1960   9 Sheets-Sheet 6

INVENTORS
JAMES W. FOLLIN, Jr.
GEORGE C. MUNRO
BY
ATTORNEYS

STEERING COMMANDS TO AUTOPILOT

INVENTORS
JAMES W. FOLLIN, Jr.
GEORGE C. MUNRO
BY
ATTORNEYS

United States Patent Office 3,215,368
Patented Nov. 2, 1965

3,215,368
DIRECTION COSINE LINKAGE
James W. Follin, Jr., Silver Spring, and George C. Munro, Fulton, Md., assignors to the United States of America as represented by the Secretary of the Navy
Filed Oct. 28, 1960, Ser. No. 65,874
8 Claims. (Cl. 244—14)

The present invention relates to homing systems for guided missiles. More particularly, it relates to improvements in the interferometer type homing system.

The interferometer guidance system, first described by O. J. Baltzer in U.S. patent application Serial No. 242,255, filed August 17, 1951, now Patent No. 3,001,186 and subsequently improved by Gulick et al. as disclosed in U.S. patent application Serial No. 603,460, filed August 10, 1956, now Patent No. 3,181,813 utilizes two pairs of spaced horn-type antennas which are fixed to the missile airframe. Since the interferometer is sensitive to relative motion between the missile and target it is necessary to eliminate from the output signal the effect of apparent changes in the target position introduced by pitching or yawing motion of the missile. While it has been recognized for some time that simply subtracting the missile motion from the interferometer signal is inadequate to compensate entirely for apparent changes in target position, nevertheless it has proven to be an adequate approximation under the following favorable circumstances. First, the missile roll rate must be reasonably small, and secondly the missile to target bearing angle must not exceed a certain reasonable value. Newer missiles of extended range and altitude performance have completely upset the qualifying limitations imposed upon former interferometer homing systems. For instance, prior missiles were designed to operate at ceilings of 60,000 ft. and at that altitude, with maximum deflection of the wings, maneuvers of only 4g's acceleration could be accomplished. Later missiles utilize the tail surfaces rather than the wings for control, and with this modification, the increased body angle of attack provides sufficient maneuver forces even up to 100,000 ft. altitudes. But as a result of increased body angle of attacks, the relative missile to target bearing angles can be expected to range through considerably greater values and the missile, formerly required to be stiffly stabilized in roll, cannot be stabilized to the same degree.

Former explanations of the interferometer homing system involved a two-dimensional or planar simplification of the geometry which did not bring out the fact that the interferometer output signals caused cross coupling between the yaw and pitch control planes. That is, if the target lies in neither the pitch nor the yaw plane, the interferometer output signal induces the missile to roll. It is obviously desirable to develop steering signals in such a fashion that no rolling is induced as the missile corrects its course, and such an undertaking constitutes one object of this invention.

Another and very important object of the invention is to eliminate the effects now characterized in the art as cosine $\beta$ errors. Further explanation of cosine $\beta$ errors appears hereinafter.

Other objects and many of the attendant advantages of this invention will be readily appreciated as the same becomes better understood by reference to the following detailed description when considered in connection with the accompanying drawings, wherein:

FIG. 5 is a perspective of one embodiment of the direction cosine linkage forming an important element of the present invention;

Although a more complete description of prior interferometer homing systems is contained in the afore-mentioned Baltzer and Gulick et al. patent applications, a brief review of the geometry upon which the prior system is based serves well to introduce a description of the present invention.

Figure 2:
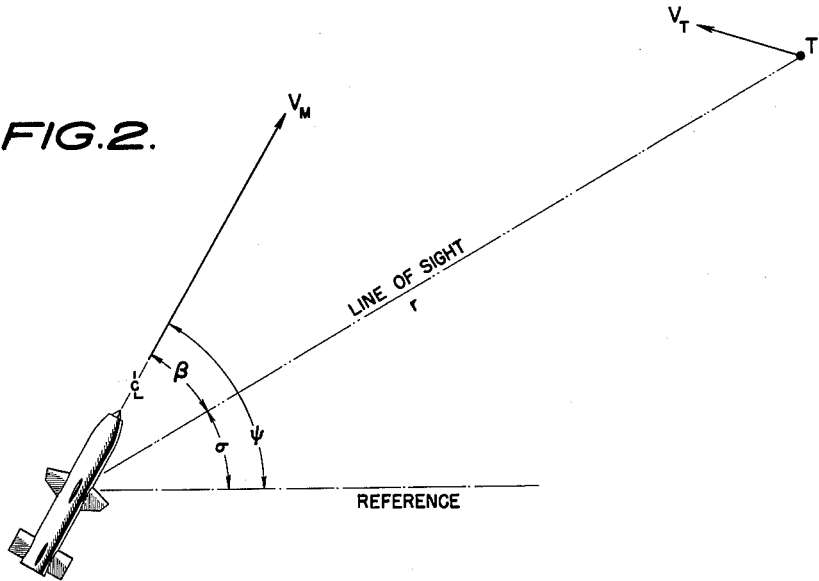
FIG. 2 is a diagram defining the angles employed in the former simplified geometry of prior homing systems.

FIG. 2 defines the angles used in the two dimensional or planar simplification of the homing geometry. A condition required in order that the missile collide with the target is that the line of sight between missile and target does not rotate. That is, $$\sigma = \text{constant; and } \frac{d\sigma}{dt} = 0$$

By inspection, $$\sigma = \psi - \beta \text{ and } \frac{d\sigma}{dt} = \dot{\sigma} = \dot{\psi} - \dot{\beta}$$

$\psi$ and its derivative $\dot{\psi}$ are readily measurable by means of gyroscopes attached to the missile. The interferometer cannot measure $\beta$ directly. It compares the phase of signals arriving at the two separated antennas to develop an output proportional to sin $\beta$. Upon differentiation, the interferometer output becomes $\dot{\beta} \cos \beta$. The cos $\beta$ term is undesired but it cannot be separated readily from the interferometer output.

Instead, it is presumed that $\beta$ excursions will be relatively small, say less than 30 degrees, and the output of the $\psi$ gyroscope is reduced by some fixed amount in compensation for the cos $\beta$ effect. The steering signal which comprises the input to the control system servo then becomes $$\dot{\sigma} = N\dot{\psi} - \dot{\beta} \cos \beta$$

where $0.8 \leq N \leq .9$, usually.

Finally, the prior system assumes that its only necessary to duplicate the pitch control system in the yaw control plane to provide satisfactory homing. When the missile roll is tightly controlled and the $\beta$ angles do not exceed 30 degrees this latter assumption is reasonable. However, if these conditions cannot be maintained, serious errors arise in the steering signals which degrade the performance of the missile and may lead to instability and complete failure.

Figure 3:
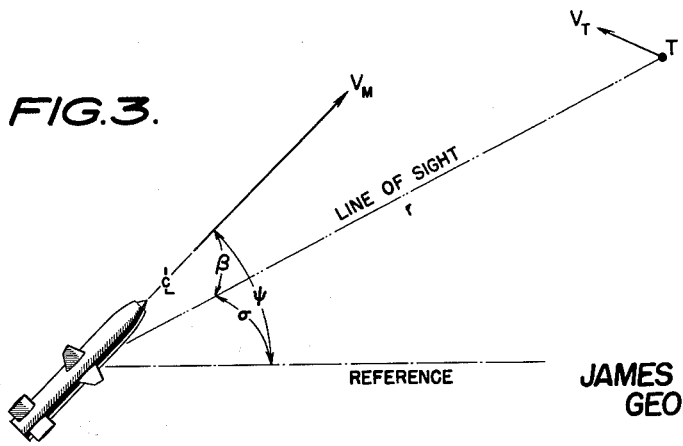
FIG. 3 is a diagram illustrating angles defined as in FIG. 2 except that the angles are shown as they would appear in three-dimensions.

As a first example of the error introduced by the two dimensional simplification, FIG. 3 presents a three dimensional view in which the same definition of angles is employed as in FIG. 2. Obviously, $\sigma$ does not equal $\psi$ $-\beta$. Moreover, the pitch and yaw rates ($\psi$ of FIG. 2) measured by the gyroscopes do not remove completely the effect of missile motion from the interferometer signal. It is necessary to define the homing geometry more exactly, commencing with the interferometer output signals.

Figure 1:
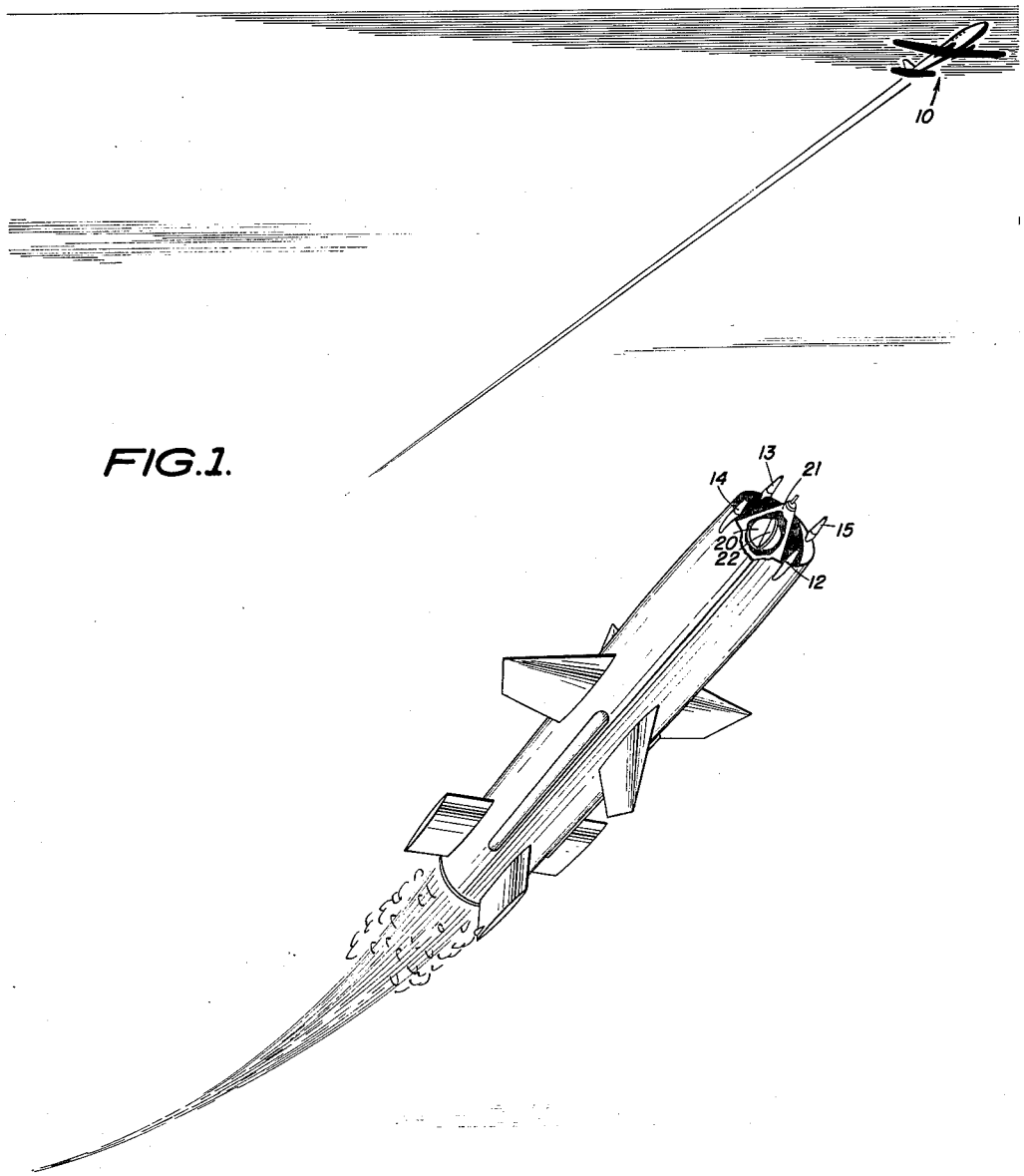
FIG. 1 is a pictorial representation of a missile homing upon a target by means of the interferometer guidance system of the present invention.
Figure 4:
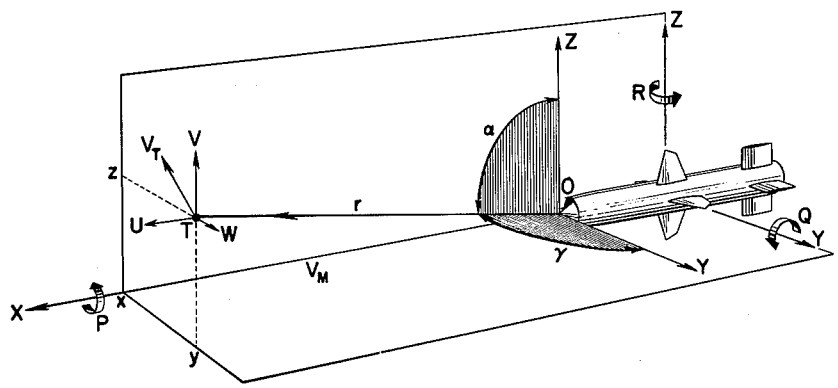
FIG. 4 is a diagram defining various angles and axes used in the more completely developed geometry of the homing system.

FIG. 1 is a pictorial representation of the present invention in operation and FIG. 4 illustrates the actual geometry of the interferometer system as it occurs in three dimensions. Referring to both of these figures, a target 10, situated at T in FIG. 4, is illuminated by a ground-based radar transmitter 11 (FIG. 1) so that energy is reflected towards the missile. It is accurate to assume that the energy is reflected as a series of plane wave fronts the normal to which is the line of sight. Two interferometer antennas 12 and 13 operating together are mounted on the missile pitch axis O—Y and another pair of antennas 14 and 15 is mounted on the yaw axis O—Z. Then it can readily be shown that the phase of the signals arriving at the antennas 12 and 13 on the O—Y axis is proportional to cos $\gamma$ where $\gamma$ is the angle between the line of sight and O—Y. Similarly, the phase of the signals arriving at the antennas 14 and 15 on the O—Z axis is proportional to cos $\alpha$ where $\alpha$ is the angle between the line of sight and the O—Z axis. The angle $\gamma$ does not lie in the X—Y plane nor does the angle $\alpha$ lie in the X—Z plane. Nevertheless, in the prior system the gyroscopes are fixed to the airframe with their input axis along OY and OZ and consequently measure the pitch (rotation in the X—Z plane about the O—Y axis) and yaw (rotation in the X—Y plane about the O—Z axis).

The actual output of the prior interferometer system operating in three dimensions will now be developed with particular reference to FIG. 4. X, Y and Z are orthogonal reference axes positioned with the X axis extending along the missile longitudinal axis with the Y and Z axes respectively defining the pitch and yaw axes of the missile. The pair of interferometer antennas mounted on the Y axis measures cos $\gamma$. The pair of interferometer antennas mounted on Z axis measures cos $\alpha$. A roll rate vector P extends along X. Pitch rate vector Q and yaw rate vector R extends respectively along Y and Z. A target T is positioned at coordinates $x, y, z$, establishing a range $r$ between the missile and target. The target velocity $V_T$ possesses components U, V, and W parallel respectively to the initial position $X_o$, $Y_o$, and $Z_o$ of the moving missile axes X, Y, and Z.

Then $$\cos \alpha = \frac{z}{r} \text{ and } \cos \gamma = \frac{y}{r}$$

The interferometer output is differentiated with respect to time to provide part of the missile steering signal. Performing this operation, the following results in $$\frac{d}{dt} (\cos \alpha) = \frac{r\dot{z}-\dot{r}z}{r^2}; \frac{d}{dt} (\cos \gamma) = \frac{r\dot{y}-\dot{r}y}{r^2}$$

The components of the velocity U, V and W, as derived in texts on dynamics, i.e., E. J. Routh "Dynamics of a Particle," are:

$$U=\dot{x}-yR+zQ$$
$$V=\dot{y}+xR-zP$$
$$W=\dot{z}-xQ+yP$$

$\dot{x}$, $\dot{y}$ and $\dot{z}$ are components of the relative missile to target velocity parallel respectively to the X, Y and Z axes and P, Q, and R are the angular rates previously defined. Rearranging the above and substituting into the expressions for $$\frac{d}{dt} (\cos \alpha) \text{ and } \frac{d}{dt} (\cos \gamma)$$

there results $$\frac{d}{dt}(\cos \alpha) = \frac{Wr-\dot{r}z}{r^2}+\frac{x}{r}Q-\frac{yP}{r} \qquad (1)$$

$$\frac{d}{dt} (\cos \gamma) = \frac{Vr-\dot{r}y}{r^2}-\frac{x}{r}R+\frac{z}{r}P \qquad (2)$$

Since $$\frac{z}{r}=\cos \alpha, \frac{x}{r}=\cos \beta \text{ and } \frac{y}{r}=\cos \gamma$$

Equations 1 and 2 can be rewritten as:

$$\frac{d}{dt} (\cos \alpha) = \frac{Wr-\dot{r}z}{r^2}+\cos \beta Q-\cos \gamma P \qquad (3)$$

$$\frac{d}{dt} (\cos \gamma) = \frac{Vr-\dot{r}y}{r^2}-\cos \beta R +\cos \alpha P \qquad (4)$$

In Equations 3 and 4 the angular rates P, Q and R are present solely as a result of missile motion and must be eliminated from the interferometer output to provide proper homing. The angular rates can, of course, be measured by rate gyroscopes having their input axis aligned with the X, Y and Z axis of the missile.

In the absence of the exact values for the direction cosines, a satisfactory expedient proved to be to multiply the pitch and yaw rates Q and R by a constant N factor which approximated the value of cos $\beta$. The roll rate P was not introduced into the steering signal. Instead, a separate roll control system was utilized in order to maintain the roll at a very low rate and thus prevent degradation of the steering signals.

Because of the extremely sluggish behavior of missiles at very high altitudes, greater accuracy is demanded of the homing system than is required at low altitude. The approximation of cos $\beta$ by N is not tolerable and it is imperative to relax the stringent requirements on the roll control system.

In accordance with the present invention, the missile control signals are developed in an entirely different manner from that of interferometer systems heretofore known. A solution to the problems vexing prior interferometer homing systems is thereby provided.

Briefly, the invention contemplates the provision of means stabilized in space to provide a reference line directed along the line of sight from missile to target. Appropriate angles and angular rates between the missile axes and the line of sight can then be measured and utilized to provide steering signals which are free from cos $\beta$ errors and which do not induce the missile to roll. The stabilized means are aptly termed a Direction Cosine Linkage because the interferometer output signal, being in the form of a direction cosine, is employed to drive the means into alignment with the line of sight. FIG. 1 illustrates the principal elements of the linkage in relation to the missile and a target. The target 10, as before, is illuminated by a ground based tracking radar. The interferometer antennas and their associated receivers provide output signals proportional to cos $\alpha$ and cos $\gamma$. These signals are applied to $\alpha$ and $\gamma$ servos which position a pair of intersecting disks 20 and 22, so arranged that one disk 20 always lies in the plane in which $\alpha$ is measured and the other disk 22 lies in the plane in which $\gamma$ is measured. The intersection or hinge line of the disks is the reference line stabilized along the line of sight. The linkage may suitably be located within the missile inner body 21, as shown, but such a location is not essential.

Figure 6:
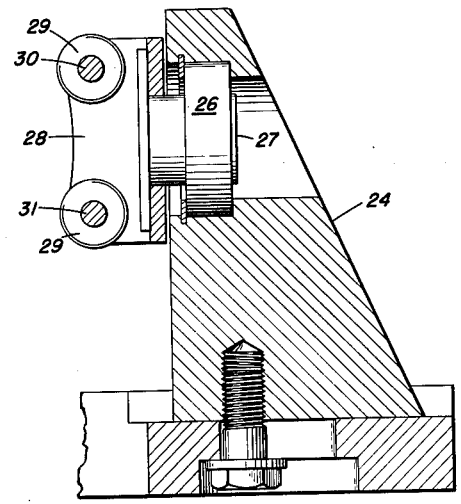
FIG. 6 is an elevation of one of the means for supporting the disks of the linkage shown in FIG. 5.

FIG. 5 illustrates the construction of the linkage in greater detail. The two disks 20 and 22, interleaved in a manner shortly to be described, constitute the $\alpha$ and $\gamma$ planes wherein the direction cosines of the line of sight to the target are measured. An annular mounting plate 23 is supported in a vertical position within the missile inner-body (not shown). A central hole in mounting plate 23 provides sufficient clearance for the disks 20 and 22 to rotate to any required position. Two support posts 24 and 25 extend forwardly from mounting plate 23 and are each equipped with a bearing 26 into which a stub shaft 27 is fitted (FIG. 6). The inner end of stub shaft 27 is fixed to a trammel yoke 28 which carries two spaced trammel wheels 29 freely rotating upon axles 30 and 31. Trammel yokes 28 and 28' are thus free to pivot about orthogonal axes which are spaced away from but parallel to mounting plate 23. A second pair of trammel yokes 32 and 32' each of which carries a pair of spaced, free running trammel wheels are pivotally supported diametrically opposite yokes 28 and 28'. Yokes 32 and 32' include the $\alpha$ and $\gamma$ drive mechanisms and are described in greater detail with reference to FIGS. 7 and 8. The trammel wheels 29 bear against and travel in two channel-like raceways 33 and 33' extending almost completely about the circumferences of disks 20 and 22. The hinge line of disks 20 and 22 represents the line-of-sight which is to be stabilized in space. The trammel wheel supports permit these disks to be positioned so as to describe both $\alpha$ and $\gamma$ substantially throughout a range of $+90°$ to $-90°$.

A rate gyroscope 40 is mounted on disk 22 with its input axis perpendicular thereto and consequently provides an output which may conveniently be identified as $G_\gamma$. A second rate gyroscope 42 is mounted on disk 20 also with its input axis perpendicular to the mounting disk and provides an output identified as $G_\alpha$. A sector gear 43 mounted on disk 22 engages a pinion 44 on the input shaft of a cosine potentiometer 165 the stator of which is secured to disk 20. The output of potentiometer 165 is consequently proportional to cosine A, where A is the angle between the planes of disks 20 and 22. Balancing weights are added to disks 22 and 20 in the form of a slug 45 and a plate 46 to counteract the weights of the rate gyroscopes 40 and 42.

Figure 7:
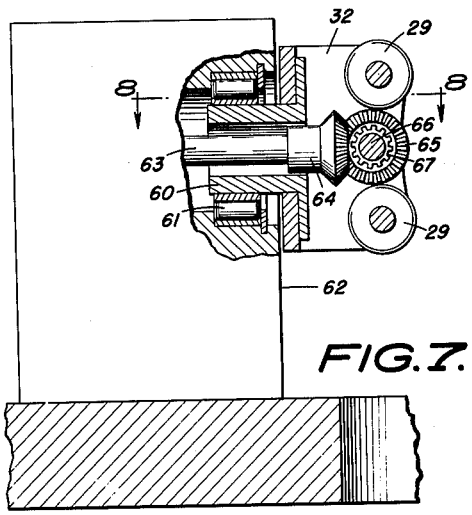
FIG. 7 is an elevation of the support means situated opposite the support of FIG. 6 and having portions thereof broken away to show elements of the drive mechanism for positioning the supported disk.
Figure 8:
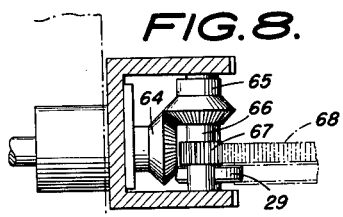
FIG. 8 is a section taken along the line 8—8 of FIG. 7.

FIGS. 7 and 8 illustrate the mechanical coupling of the $\alpha$ and $\gamma$ drive mechanisms to disks 20 and 22. Yoke 32 is secured to a stub shaft 60 which is rotatably mounted in a bearing 61 supported by the $\alpha$ drive housing 62. A shaft 63 coupled to the $\alpha$ servomotor (shown schematically in FIG. 13) extends coaxially through shaft 60 and is rotatable independently of shaft 60. A bevel gear 64 is secured to the end of shaft 63 and meshes with another bevel gear 65 mounted on a shaft 66 extending transversely across yoke 32 medially of the shafts supporting trunnion wheels 29. Shaft 66 carries a pinion gear 67 which meshes with the toothed periphery 68 of disk 20. Thus yoke 32 is free to pivot as may be required by motion of disk 22 and the $\alpha$ drive mechanism is free to supply the required rotation to disk 20. The $\gamma$ drive mechanism is identical in construction to the $\alpha$ drive mechanism and need not be separately described.

Figure 10:
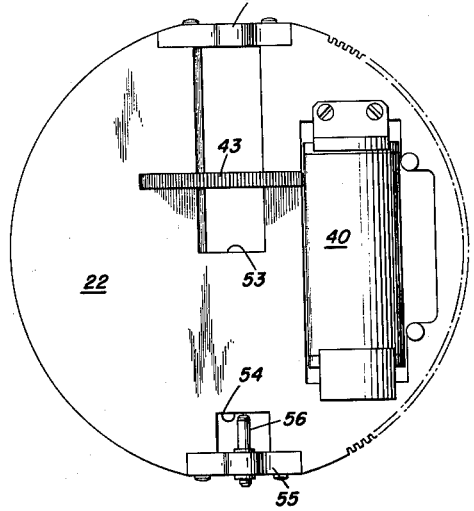
FIG. 10 is an elevation of the other of the disks of the linkage of FIG 5.
Figure 9:
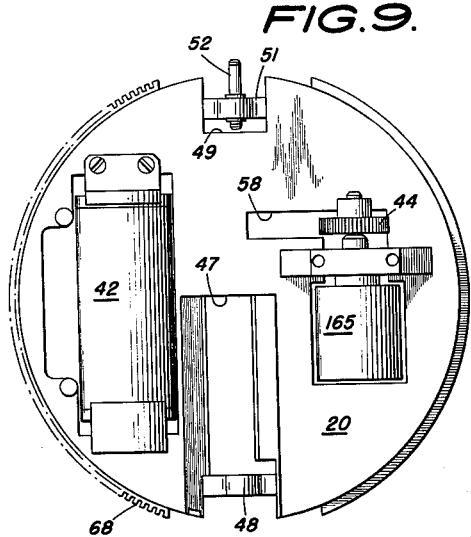
FIG. 9 is an elevation of one of the two disks forming elements of the linkage of FIG. 5.

FIGS. 9 and 10 illustrate disks 20 and 22 separated in order to show the manner of interleaving.

Referring first to FIG. 9, a slot 47 extends through disk 20 to a length somewhat greater than the radius thereof. A suitable bearing 48 is fitted into slot 47 near the open end thereof. Diametrically opposite slot 47 a second, shorter slot 49 is cut into disk 20 to receive a bearing 51 and pin 52. In FIG. 10 slots 53 and 54 will be seen in disk 22 which are similar to slots 47 and 49 except that the positions have been inverted. A bearing 55 and pin 56 are fitted in slot 54 and a bearing 57 closes slot 53. Sector gear 43 is shown extending across slot 53, but it will be understood that the gear is removed during the assembly of disks 20 and 22. In assembling the disks, slot 47 is dropped into slot 53 with the sidewalls of slot 47 depending over the unslotted portion of disk 22. Pin 56 is inserted in bearing 48 and pin 52 is inserted in bearing 57 to secure the disks in place. Finally sector gear 43 is extended through a slot 58 is disk 20 to mesh with pinion 44 and secured to disk 22.

An "ideal" proportional or intercept navigational course is that course which so adjusts the angular rotation of the missile that relative motion between the missile and the target will not cause a rotation of the missile to target line-of-sight. This definition is valid in either two or three dimensions and its application may be understood by again referring briefly to FIG. 1.

When the line-of-sight is not rotating $\dot{\sigma} = \dot{\psi} = \dot{\beta} = 0$. If the target maneuvers, $\dot{\beta}$ will not equal zero and the missile turning rate $\dot{\psi}$ must be adjusted to equal $\dot{\beta}$ in order to maintain $\dot{\sigma}$ at zero.

The navigation law is taken to be $$\dot{\psi} = \lambda \dot{\sigma}$$

Therefore in ideal although non-realistic terms, the input to the missile steering servo is the difference between $\dot{\beta}$ and $\dot{\psi}$ multiplied by a constant gain factor, $\lambda$. The practical difficulties in achieving such an ideal signal with prior apparatus have been shown. It is proposed now to develop the form which the input to the steering servo must take in order that the performance of the present invention may approach the ideal.

Figure 11:
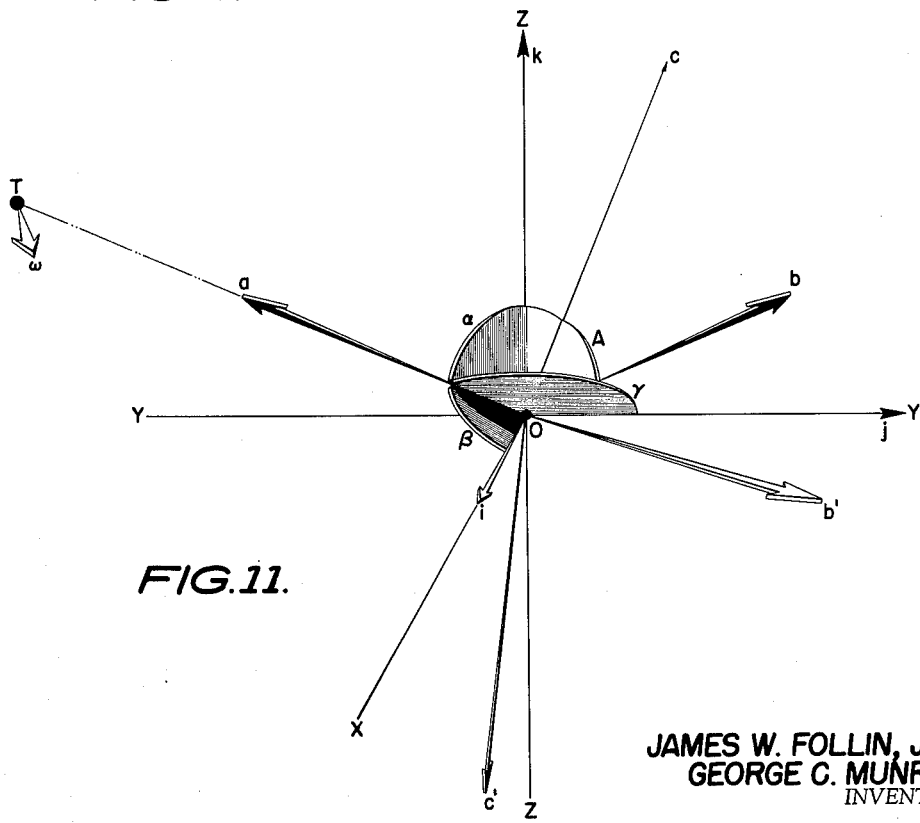
FIG. 11 is a vector diagram useful in explaining the operation of the present invention.

FIG. 11 is a vector diagram useful in explaining the operation of the invention. Only the missile axes are shown in the diagram, the elements of missile and the direction cosine linkage having been omitted for clarity. The vectors in FIG. 11 are disposed as follows:

"$a$" is a unit vector directed along the hinge line of disks 20 and 22. It is assumed that vector "$a$" coincides with the line-of-sight from missile to target, although in an analysis more detailed than necessary for present purposes, some error would be presumed to exist between the hinge line and the line-of-sight.

"$b$" is a unit vector perpendicular to "$a$" lying in the plane YOT, the plane of disk 22, in which the angle $\gamma$ is measured.

"$c$" is a unit vector lying in the plane ZOT, the plane of disk 20, in which the angle $\alpha$ is measured.

"$b'$" is a unit vector perpendicular to vectors "$a$" and "$c$" which represents the input axis of gyroscope 42 mounted on disk 20.

"$c'$" is a unit vector perpendicular to vectors "$a$" and "$b$" which represents the negative of the input axis of gyroscope 40 mounted on disk 22.

$i$, $j$, and $k$ are unit vectors lying respectively along the X, Y, and Z axes of the missile; and "A" is the angle between the planes of disks 20 and 22.

The angular velocity $\Omega$ of the missile can be expressed as the sum of its components along any three mutually perpendicular axes Therefore $$\Omega = \Omega_a a + \Omega_{b'} b' + \Omega_c c \quad (5)$$

$$= \Omega_a a + \Omega_b b + \Omega_{c'} c' \quad (6)$$

$$= pi + qj + rk \quad (7)$$

Let $\omega$ be the component of the angular velocity of the target which is perpendicular to the vector "$a$". Then $$\omega = \omega_{b'} b' + \omega_c c \quad (8)$$

$$= \omega_b b + \omega_{c'} c' \quad (9)$$

$$= \omega_i i + \omega_j j + \omega_k k \quad (10)$$

The three dimensional navigation law may be written analogously to the two dimensional case as $$\Omega = -\frac{\lambda \dot{R}}{Y_M \cos \beta} \omega \tag{11}$$

then from Equation 7

$$p = -\frac{\lambda \dot{R}}{Y_M \cos \beta} \omega_i \tag{12}$$

$$q = \frac{\lambda \dot{R}}{Y_M \cos \beta} \omega_j \tag{13}$$

$$r = \frac{\lambda \dot{R}}{Y_M \cos \beta} \omega_k \tag{14}$$

The following transforms are derived from FIG. 11:

$$\omega_i = -\omega_b \frac{\cos \gamma \cos \beta}{\sin \gamma} - \omega_{o'} \frac{\cos \alpha}{\sin \gamma} \tag{15}$$

$$= -\omega_{b'} \frac{\cos \gamma}{\sin \alpha} - \omega_o \frac{\cos \alpha \cos \beta}{\sin \alpha}$$

$$\omega_j = \omega_b \sin \gamma \tag{16}$$

$$\omega_k = \omega_c \sin \alpha \tag{17}$$

In order to satisfy exactly the navigation law expressed by Equations 12, 13, and 14 it would be necessary to steer in roll as well as in pitch and yaw. But steering in roll unduly complicates the control system and therefore the navigation law is modified to require that only Equations 13 and 14 be satisfied.

Since gyroscopes 42 and 40 measure $\omega_{b'}$ and $\omega_{c'}$, Equations 13 and 14 must be rewritten to involve only the available information. From FIG. 11, $$\omega_b = \omega_c \cos A + \omega_{b'} \sin A$$

$$\omega_c = \omega_b \cos A + \omega_{c'} \sin A$$

whence $$\omega_b = \frac{\omega_{b'} + \omega_{o'} \cos A}{\sin A} \tag{18}$$

$$\omega_c = \frac{\omega_{o'} + \omega_{b'} \cos A}{\sin A} \tag{19}$$

Since $\cos \beta = \sin \alpha \sin \gamma \sin A$ the following may be derived by combination of the foregoing equations.

$$q = -\frac{\lambda \dot{R}}{Y_M} \csc \alpha \csc^2 A (\omega_{b'} + \omega_{o'} \cos A) \tag{20}$$

$$r = -\frac{\lambda \dot{R}}{Y_M} \csc \gamma \csc^2 A (\omega_{o'} + \omega_{b'} \cos A) \tag{21}$$

In practice, unavoidable errors prevent the vector "a" from pointing exactly at the target. The error in the pointing of "a" is known however inasmuch as it constitutes the input to the $\alpha$ and $\gamma$ servos. It is desirable to correct the output signals of gyroscopes 40 and 42 by subtracting out the effect of error in the pointing of "a" and thus render the available signals more nearly equal to those required by Equations 20 and 21. Therefore $\omega_{b'}$ is approximated by $\mu_\alpha$ and $\omega_{c'}$ is approximated by $\mu_\gamma$ where $$\mu_\alpha = G_\alpha - \frac{\dot{\epsilon}_\alpha}{\sin \alpha} = G_\alpha - \dot{\epsilon}_\alpha \csc \alpha \tag{22}$$

$$\mu_\gamma = -G_\gamma + \frac{\dot{\epsilon}_\alpha}{\sin \gamma} = -G_\gamma + \dot{\epsilon}_\gamma \csc \gamma \tag{23}$$

$G_\alpha$ and $G_\gamma$ are the outputs of gyroscopes 42 and 40 respectively and $\dot{\epsilon}_\alpha$ and $\dot{\epsilon}_\gamma$ are the time derivatives of the error input to the $\alpha$ and $\gamma$ servos later to be described.

The steering equations in final form are therefore $$a_{c_k} = \frac{-\lambda \dot{R} \csc \alpha \csc^2 A (\mu_\alpha + \mu_\gamma \cos A)}{(1 + \tau_D)} \tag{24}$$

$$a_{c_j} = \frac{-\lambda \dot{R} \csc \gamma \csc^2 A (\mu_\gamma + \mu_\alpha \cos A)}{(1 + \tau_D)} \tag{25}$$

where $a_{c_k}$ and $a_{c_j}$ are the desired accelerations in the $k$ and $j$ directions and $$\frac{1}{(1 + \tau_p)}$$

is the transfer function of a smoothing filter.

Figure 12:
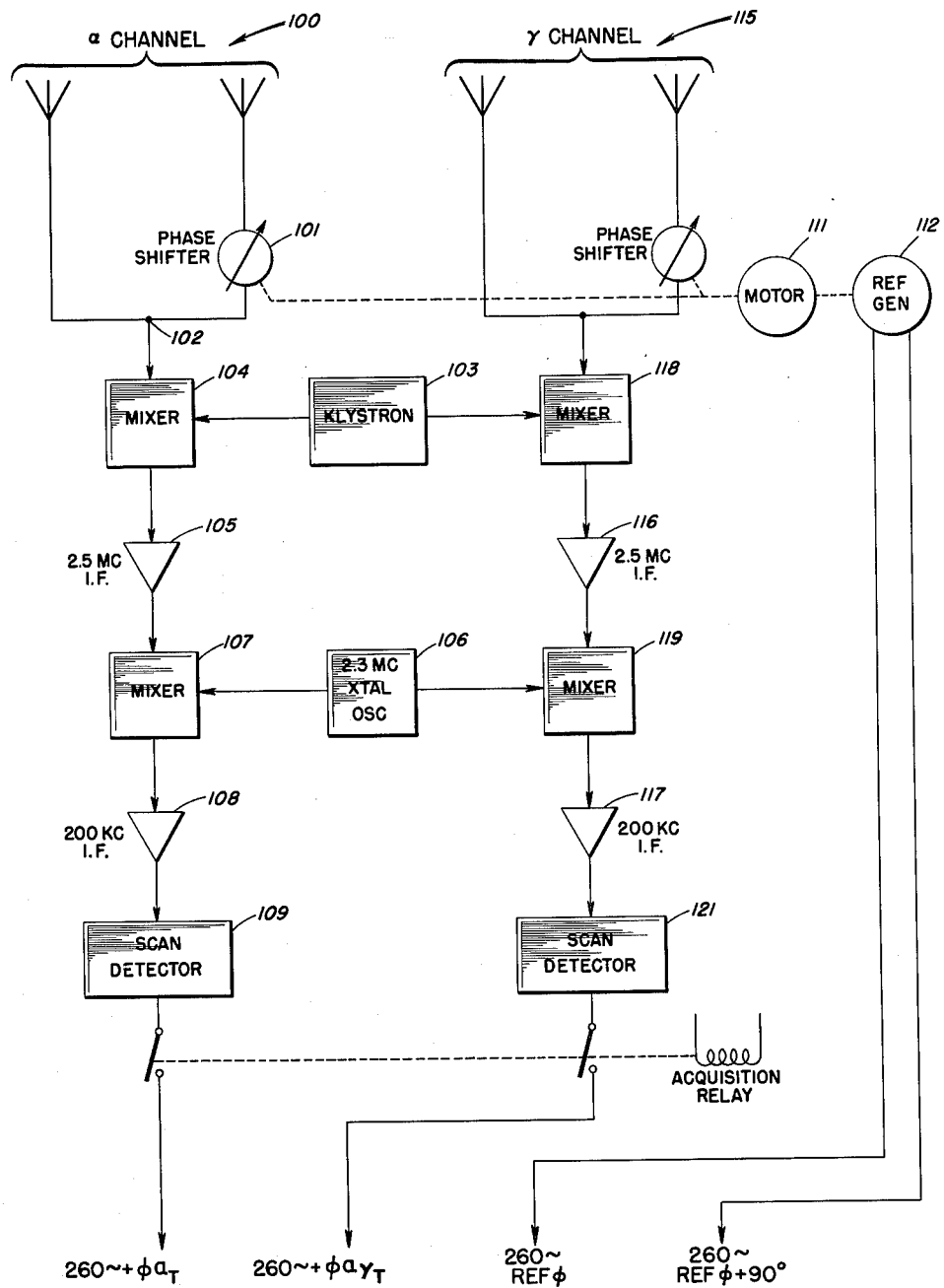
FIG. 12 is a functional block diagram of the receiver used in connection with the invention.
Figure 13:
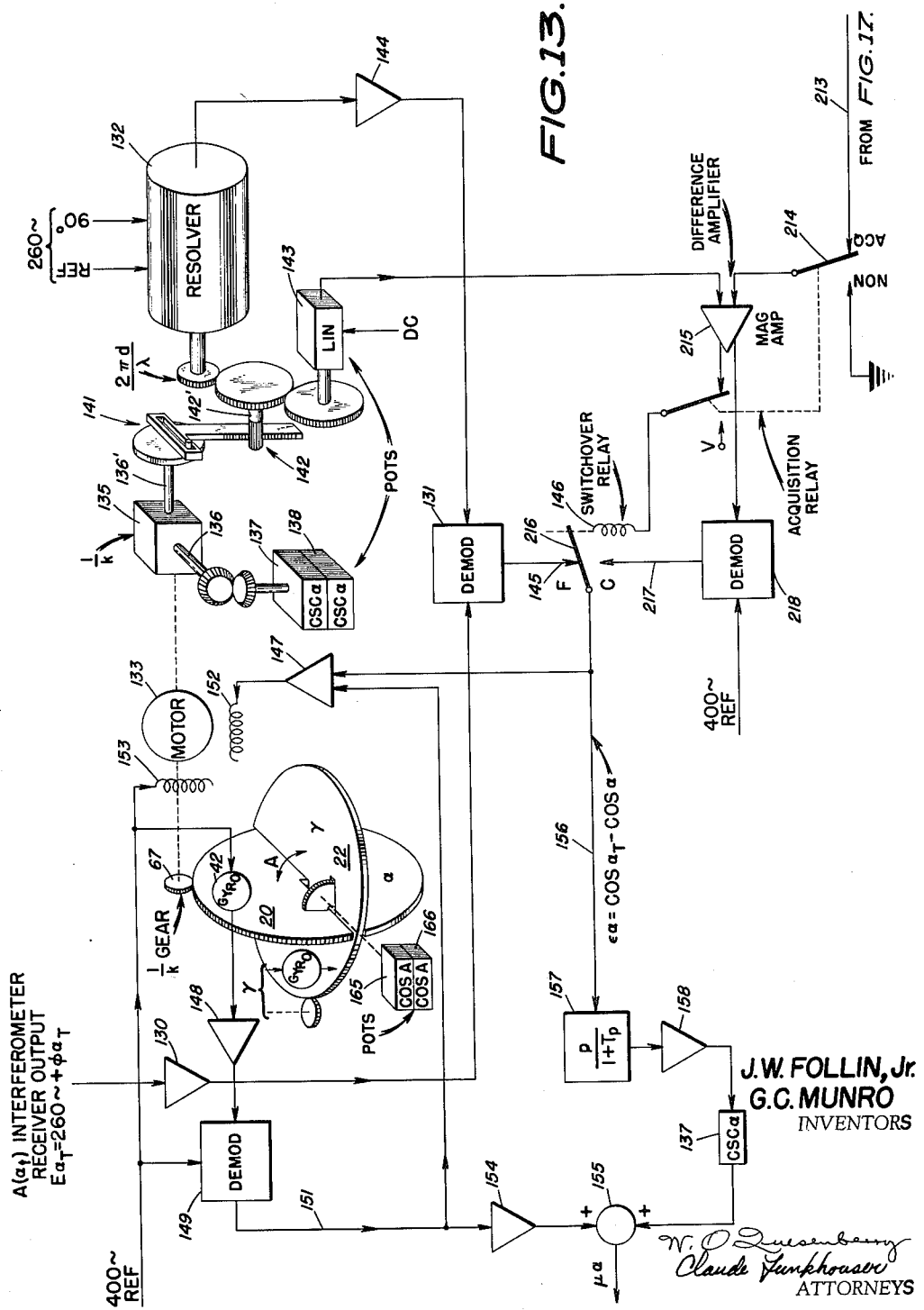
FIG. 13 is a schematic of the linkage of FIG. 5 together with elements of the drive mechanism necessary for orienting in space one channel of the linkage.
Figure 14:
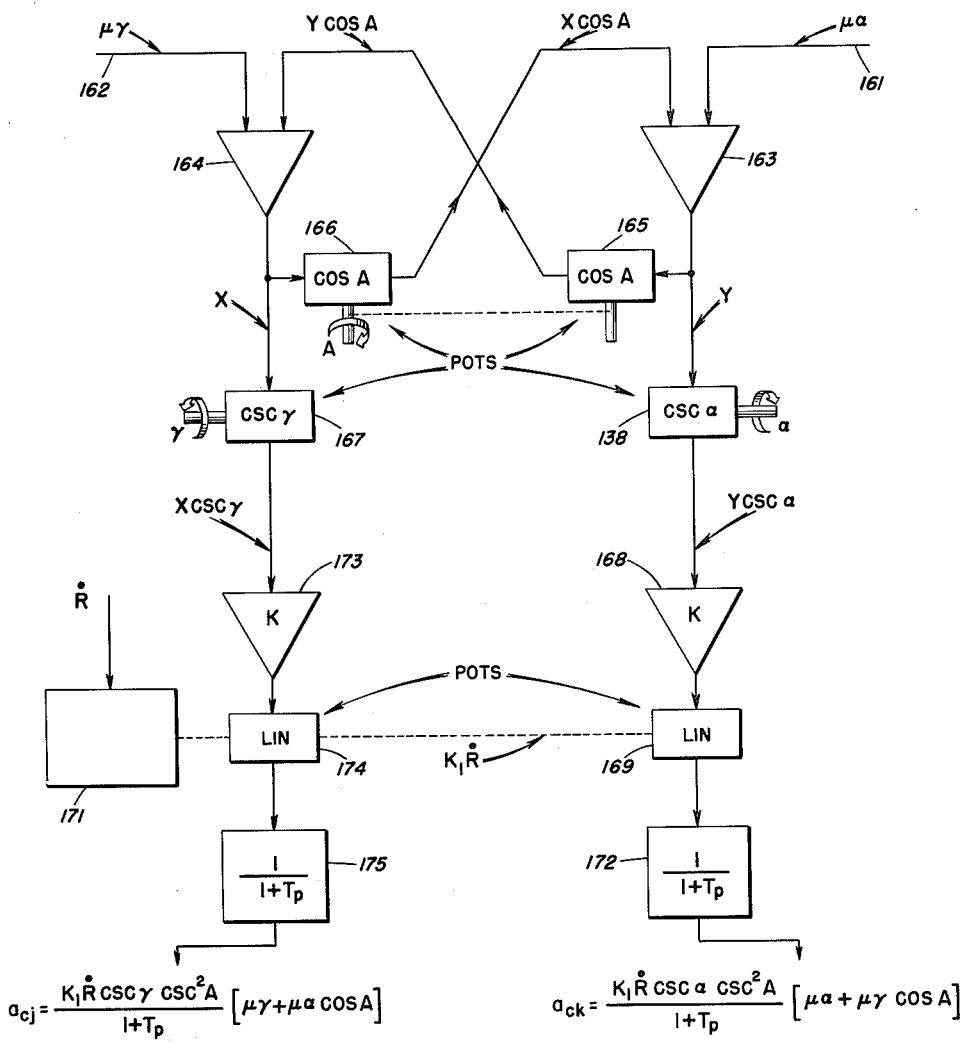
FIG. 14 is a functional block diagram of the computer operated in connection with the linkage of FIG. 5 to produce missile steering signals.

FIGS. 12, 13, and 14 are block diagrams illustrating electrical circuits and instrumentation providing steering signals in the form expressed by Equations 24 and 25.

FIG. 12 illustrates the interferometer receiver which provides a signal containing information of $\cos \alpha_T$ and $\cos \gamma_T$. The two interferometer antennas mounted on the missile Y axis are shown at 100. A microwave phase shifter 101 is inserted in the transmission line conveying the output of one antenna toward a suitable summing junction 102 which the output of the other antenna is also applied. The interference generated by the combined antenna signals produces an output containing $\cos \alpha_T$ in terms of phase. Phase shifter 101 provides a reference to which the output of summing junction 102 is later compared in order to determine its phase and thus $\cos \alpha_T$. Prior to the comparison, however, the microwave signal from junction 102 is reduced in frequency by combination with the output of a klystron local oscillator 103 in a mixer 104. The output of mixer 104 is amplified in a first intermediate frequency amplifier 105, further converted and amplified by means of oscillator 106, mixer 107 and second intermediate frequency amplifier 108. A scan detector 109 recovers from amplifier 108 a signal in the form of $$e_1 = E_1 \cos\left(2\pi f_s t + \frac{2\pi d}{\lambda} \cos \alpha_T\right)$$

Phase shifter 101 is driven continuously by a motor 111 to which is coupled an alternating current reference generator 112 providing an output in the form of $e_2 = E \cos 2\pi f_s t$. Therefore upon comparison of $e_1$ with $e_2$, in a portion of the circuit later to be described, a direct voltage proportional to $\cos \alpha_T$ is developed.

The pair of antennas 115 mounted on the Z axis of the missile, first and second intermediate frequency amplifiers 116 and 117, mixers 118 and 119 and detector 121 function in a manner identical to that just described for antennas 100 except that the different geometrical orientation results in a detector output having the form $$e_3 = E \cos\left(2\pi f_s t + \frac{2\pi d}{\lambda} \cos \gamma_T\right)$$

The receiver of FIG. 12 is more fully disclosed in U.S. patent application Serial No. 762,898, filed September 23, 1958, by B. D. Dobbins et al. for Doppler Homing System.

Referring now to FIG. 13 wherein the direction cosine linkage drive for the $\alpha$ disk 20 is shown. It should be understood that identical components are provided to drive $\gamma$ disk 22 and that both $\alpha$ and $\gamma$ drive mechanisms function continuously to stabilize the hinge line of disks 20 and 22 along the line of sight.

The output of detector 109 (FIG. 12) is conducted to an amplifier 130 and thence to a phase sensitive demodulator 131. The outlet of reference generator 112 (FIG. 12) is employed as the exciting voltage for a resolver 132. A two phase induction type servomotor 133 is connected to pinion gear 67 (also seen in FIG. 7) which engages the toothed periphery of disk 20. The gear ratio of pinion 67 to disk 20 is 1/K so that the shaft angle of motor 133 is actually $K\alpha$ and the torque output of the motor is consequently multiplied. A second gear train 135 is also connected to the shaft of motor 133 with a ratio of 1/K to drive output shafts 136 and 136' to a position equal to the direction angle α. Two potentiometers 137 and 138 are driven at a 1:1 ratio by shaft 136. The resistance elements of potentiometers 137 and 138 are loaded or otherwise so shaped that the output voltage will be proportional to the cosecant of the position angle of the potentiometer arm. Consequently the outputs of potentiometers 137 and 138 are proportional to cosecant α. These outputs are later utilized in computing the steering signals.

A cosine mechanism, which may be in the well known form of a scotch yoke 141 with rack and pinion 142, converts the rotation of shaft 136' into a cosine dependent on rotation of shaft 142'. A linear potentiometer 143 is coupled to shaft 142' with a 1:1 ratio and thus provides an electrical output proportional to cos α. The output of potentiometer 143 is used in the coarse positioning system later to be described. Resolver 132, previously mentioned, is coupled to shaft 142' through a gear train providing a ration of $2\pi d/\gamma$. The function of resolver 132 is to shift the phase of the output of reference generator 112 proportionately to the rotation of shaft 142'. Therefore the output of resolver 132 can be expressed as $$e_4 = E \cos\left(2\pi f_s t + \frac{2\pi d}{\lambda} \cos \alpha\right)$$

Following amplification in an amplifier 144, the output of resolver 132 forms the reference voltage input to demodulator 131. The output of demodulator 131 is a direct voltage proportional to the phase difference between its inputs. Consequently the output $\epsilon_a$ of demodulator 131 can be written as $$\epsilon_a = K(\cos \alpha_T - \cos \alpha)$$

and this output taken from contact 145 on a switchover relay 146 is one term of the control or signal voltage of a magnetic amplifier 147. The second term of the signal voltage to amplifier 147 is a rate damping term derived from the α rate gyroscope 42 mounted on disk 20. Gyroscope 42 employs a well known phase shift pick-off system in which the phase of a 400 c.p.s. reference voltage is shifted in proportion to the angular rate input to the gyroscope's sensitive axis. There are consequently provided an amplifier 148 and a phase sensitive demodulator 149 to provide a direct voltage output on lead 151 proportional to $G_a$, the angular rate input to gyro 42.

The complete control signal to amplifier 147 is therefore $KG_a$ (cos $\alpha_T$ — cos α). Magnetic amplifier 147 modulates the flow of alternating current from a 400 c.p.s. source to the variable field 152 of servomotor 133 in magnified proportion to the control signal. The quadrature field 153 of servomotor 133 receives power directly from the 400 c.p.s. power source. Motor 133 then rotates disk 20 until a null position is reached at which the control signal to amplifier 147 is reduced to zero.

The gyro signal appearing on lead 151 is passed through an inverting amplifier 154 where its polarity is changed and then applied as one input to a summing junction 155. The α error signal appearing on lead 156 is passed through a differentiating network 157 providing $\dot{\epsilon}_a$ and then to an inverting amplifier 158. Potentiometer 137, the arm of which is coupled to shaft 136, previously mentioned, receives the error rate output from amplifier 158 and provides the product $\dot{\epsilon}_a$ csc α. This product forms the second input to summing junction 155 and hence there appears at the output of the junction the sum $\mu_a$ required by the steering signal computer.

The steering signal computer is illustrated in FIG. 14. It will be understood that the second input $\mu_\gamma$ required by the computer is derived by apparatus identical to that disclosed in FIG. 13 except for obvious differences with respect to the interferometer input signal and the geometrical disposition of gyroscope 40 and the γ drive mechanism. The $\mu_a$ and $\mu_\gamma$ inputs appear at leads 161 and 162 where they are respectively applied to summing amplifiers 163 and 164. The output of summing amplifier 163, which for convenience may be identified as $y$, is applied to a cosine potentiometer 165 geared to measure the angle A between disks 20 and 22 (FIGS. 5 and 13). The output of potentiometer 165 then forms a second input to summing amplifier 164. Similarly, the output of amplifier 164, identified as $x$, is applied to cosine potentiometer 166, mechanically connected to potentiometer 165 so as also to be driven through the angle A, and fed back to amplifier 164. Then the following relationships obtain;

$$x = \mu_\gamma + y \cos A$$
$$y = \mu_a + x \cos A$$

and by substitution $$x = (\mu_\gamma + \mu_a \cos A) \csc^2 A$$
$$y = (\mu_a + \mu_\gamma \cos A) \csc^2 A$$

To complete the steering equations, $x$ must be multiplied by $K\dot{R}$ csc γ and $y$ must be multiplied by $K\dot{R}$ csc α. Cosecant potentiometer 138 (FIG. 13) receives the output of amplifier 163 to perform the multiplication of $y$ by csc α. The output of potentiometer 138 is fed to an amplifier 168 having a gain K and thence to a linear potentiometer 169. A position servo 171 receives a voltage proportional to $\dot{R}$, the range rate, from the missile range gate circuit (not shown) and adjusts the position of the arm of potentiometer 169 in proportion thereto. The output of potentiometer 169 is therefore $K\dot{R}$ csc α.$y$ and after filtering in a simple passive network 172 having a transfer characteristic $$\frac{1}{(1+T_p)}$$

the final signal becomes $$\frac{K\dot{R} \csc \alpha.y}{(1+T_p)}$$

which more completely is $$\frac{K\dot{R} \csc \alpha \csc^2 A}{(1+T_p)}(\mu_a + \mu_\gamma \cos A)$$

the required signal of Equation 24, except for an inversion of sign.

A similar arrangement for multiplying the output of amplifier 164 by $K\dot{R}$ csc γ includes cosecant potentiometer 167 coupled to the γ drive mechanism of disk 22 similarly to the coupling of potentiometer 138 to the α drive mechanism. An amplifier 173 multiplies the output of potentiometer 167 by the required constant gain factor K and a linear potentiometer 175 driven by servo 171 inserts the factor $\dot{R}$ in the product. A filter network 175 with transfer characteristic $$\frac{1}{1+T_p}$$

completes the computation and provides at its output $$\frac{K\dot{R} \csc \gamma y}{(1+T_p)}$$

which more completely expressed is $$\frac{K\dot{R} \csc \gamma \csc^2 A}{(1+T_p)}(\mu_\gamma + \mu_a \cos A)$$

the required $a_{c_j}$ signal of Equation 25, except for an inversion of sign. Negative polarity may be supplied to the outputs of filters 172 and 175 in a number of obvious ways. For example, an inverting amplifier can be used or the sense of the servo driving the missile control surfaces can be reversed.

As disclosed in the aforesaid Gulick et al. patent application the interference pattern created by two antennas consists of a plurality of lobes. The linkage positioning mechanism thus far described is incapable of distinguishing one lobe of the pattern from another and consequently with an auxiliary coarse positioning device, the values of $\alpha$ and $\gamma$ indicated by the linkage could be in error by as much as the width of two or three lobes of the antenna pattern.

Figure 15:
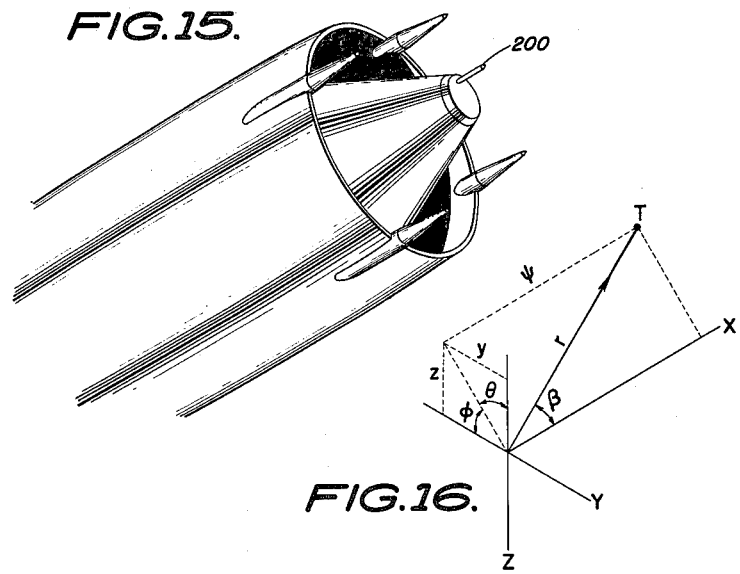
FIG. 15 is a perspective of the front portion of a missile having a nutating antenna mounted thereon for use in coarsely orienting in space the linkage of FIG. 5.
Figure 17:
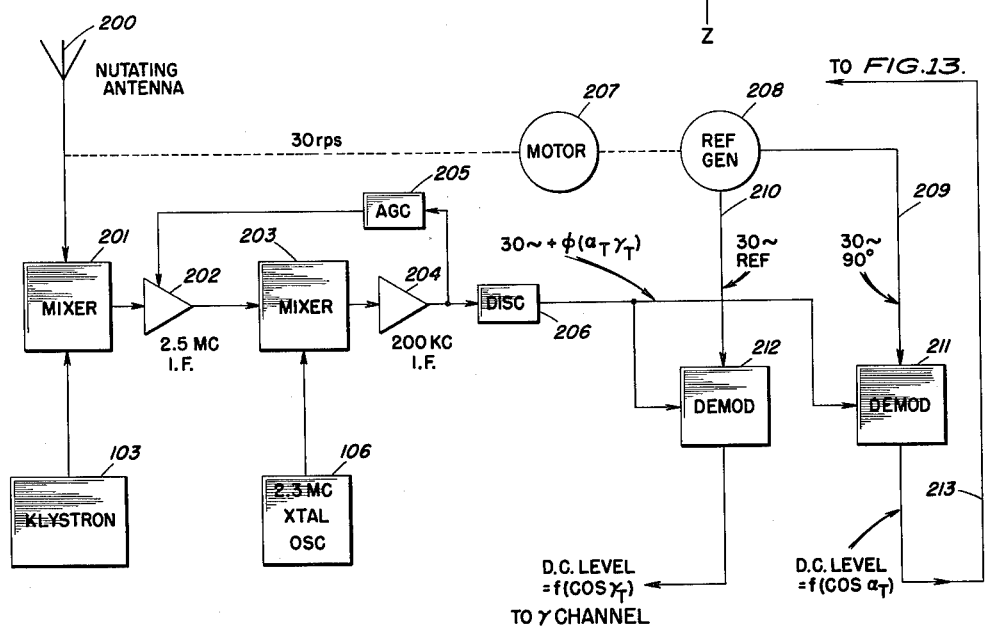
FIG. 17 is a functional block diagram of the system for coarsely orienting the linkage of FIG. 5.

There is therefore provided a coarse positioning system, illustrated in FIGS. 15 and 17, which functions at the commencement of homing to drive the hinge line of disks 20 and 22 into alignment with the line of sight within a limit of error of the width of one lobe of the antenna pattern. As seen in FIG. 15, a fifth auxiliary antenna 200 is mounted for rotation about the missile roll axis Z. When the target lies on the Z axis, rotation or nutation of the antenna 200, induces Doppler frequencies in its output which are of the form $$F_D = F_V + \left[\frac{2\pi rN}{\lambda} \sin 2\pi Nt\right]$$

wherein $F_D$ is the frequency of the signal output of antenna 200,
$F_V$ is the Doppler frequency resulting from relative motion between the missile and the target,
$r$ is the radius of the circular path through which antenna 200 is rotated,
$N$ is the speed of rotation of antenna 200 in revolutions per second, and
$\lambda$ is the wave length of the received signal.

Only rarely does the target lie on the missile Z axis and therefore a more general expression of the frequency of the output signal of antenna 200 is $$F_D = F_V + \left[\frac{2\pi rN}{\lambda} \sin 2\pi Nt\right] \sin \beta$$

Figure 16:
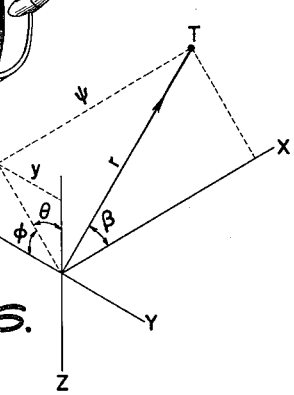
FIG. 16 is a vector diagram useful in explaining the operation of the coarse positioning system.

The Doppler term $F_V$ due to relative motion is eliminated by the Doppler tracking circuits of the receiver described in the aforesaid Dobbins et al. patent application, consequently only the last, alternating term of the above equation need be considered hereinafter. By the use of a reference generator and a pair of phase sensitive demodulators, combined as later described, the antenna output signal is referenced to the angles $\theta$ and $\phi$ illustrated in FIG. 16, and may be expressed as $$E_1 = K \sin \beta \cos \theta \quad (26)$$
$$E_2 = K \sin \beta \cos \phi \quad (27)$$

also from FIG. 16

$$\sin \beta = \frac{\sqrt{y^2 + z^2}}{r}$$

$$\cos \theta = \frac{z}{\sqrt{y^2 + z^2}}$$

$$\cos \phi = \frac{y}{\sqrt{y^2 + z^2}}$$

$$\cos \gamma = \frac{y}{r}$$

$$\cos \alpha = \frac{z}{r}$$

Therefore $$E_1 = K \cos \alpha, \text{ and } E_2 = K \cos \gamma$$

which signals are used for coarse positioning of the direction cosine linkage.

FIG. 17 is a block diagram of the coarse positioning circuitry. The signal from antenna 200 is applied to a mixer 201 which reduces the frequency to a lower intermediate value by beating the incoming signal with the output of klystron 103. The IF signal is boosted by an amplifier 202 and further reduced in frequency by a second mixer 203 which also receives a portion of the output of oscillator 106. A second intermediate frequency amplifier 204 further amplifies the signal and supplies an automatic gain control circuit 205. A discriminator 206 centered at the frequency of amplifier 204 provides an output in the form of $$e = \cos [2\pi Nt + \sin \beta (\cos \theta + \cos \phi)]$$

A motor 207 rotates antenna 200 at the desired speed N and also drives a reference generator 208. Reference generator 208 provides a two phase alternating current output, one phase of which on lead 209, is referenced to the missile Z axis and the other phase of which, on lead 210, is referenced to the missile X axis. A phase sensitive demodulator 211, operating with the voltage on lead 209 as a reference, detects the output of discriminator 206 to provide an output signal $E_1 = K \sin \beta \cos \theta$ which is equivalent to $E = K \cos \alpha$. A second phase sensitive demodulator 212, employing the voltage on lead 210 as a reference, extracts an output $E_2 = K \sin \beta \cos \phi = K \cos \gamma$ from the output of discriminator 206. The outputs of demodulators 211 and 212 are conducted to the $\alpha$ and $\gamma$ drive mechanisms for coarsely positioning disks 20 and 22.

Again referring to FIG. 13, only the coarse $\alpha$ drive positioning will be considered although it will be understood that a similar arrangement is provided for $\gamma$. The output of demodulator 211 appears on lead 213 connected to contacts 214 on an acquisition relay (not shown). The purpose of the acquisition relay is to ground the inputs to the $\alpha$ and $\gamma$ drive mechanisms so that in the absence of an actual target signal the linkage will not be driven aimlessly about. From contacts 214 the signal is applied to a magnetic amplifier 215. Amplifier 215 provides a direct current output for controlling switchover relay 146 and modulates 400 c.p.s. alternating current both outputs being in proportion to the difference between the signal from contacts 214 and the output of potentiometer 143. When this difference is large, as will result from an error in the $\alpha$ position of disk 20, a substantial voltage is present in the output of amplifier 215 to energize relay 146. Relay 146 when energized moves arm 216 into engagement with contact 217 and switches the error signal input of amplifier 147 from the fine position to the coarse position. Since a direct current signal is required by amplifier 147, a demodulator 218 is provided to convert the alternating output of amplifier 215 to direct current. Therefore, in summary, a large difference output from amplifier 215 energizes relay 146 and applies the coarse position error signal to amplifier 147. Motor 133 then rotates disk 20 at the same time altering the output of potentiometer 143 in such a direction as to reduce the output of amplifier 215. At a selected low level, relay 146 drops out and the interferometer antennas assume control of motor 133.

Obviously many modifications and variations of the present invention are possible in the light of the above teachings. It is therefore to be understood that within the scope of the appended claims the invention may be practiced otherwise than as specifically described.

What is claimed is:

1. A homing system for a guided missile, comprising at least a pair of antennas for receiving radiation from a target, means combining the outputs of said antennas to provide a signal indicating the bearing of the target from the missile, a platform in the missile adapted for relative movement with respect to the missile, a servomotor in the missile for controlling the position of said platform relative to the missile, said servomotor being responsive to said signal from said combining means to position said platform according to the bearing of the target from the missile, a gyroscope mounted on said platform and providing an output indicative of motion of said platform, and means receiving said gyroscope output for computing signals for steering the missile.

2. A homing system for a guided missile, comprising two pairs of separated antennas for receiving radiation from a target, a first pair of said antennas being in a first control plane of said missile and forming a first reference axis, the second pair of said antennas being in a second control plane of said missile and forming a second reference axis, said first and second axes being perpendicular to each other, first means combining the outputs of the antennas of said first pair to produce a signal indicative of the missile to target direction cosine measured from said first reference axis, second means combining the outputs of the antennas of said second pair to produce a signal indicative of the missile to target direction cosine measured from said second reference axis, a linkage including positioning means responsive to said direction cosine signals for establishing a reference in the missile aligned with the missile to target sight line, first and second gyroscopes coupled to said linkage so as to be sensitive to motion of said linkage relative to the missile, said first gyroscope producing an output indicating rotation of said linkage in the plane defined by the intersection of the missile to target sight line and said first reference axis, said second gyroscope producing an output indicating rotation of said linkage in the plane defined by the intersection of the missile to target sight line and said second reference axis, and means receiving the outputs of said gyroscopes for computing missile steering signals.

3. Apparatus as defined in claim 2 with additionally means coupled to said computing means and providing an output indicative of the angle between the planes of sensitivity of said first and second gyroscopes.

4. Apparatus as claimed in claim 3 wherein said computing means includes trigonometric function generators arranged to be driven by said linkage.

5. In a guided missile homing system of the interferometer type, a direction cosine linkage comprising a pair of disks hinged together along a mutual diameter, means supporting said disks for movement relative to the airframe of the missile, a first and second pair of antennas for receiving radiation from a target, first means for combining the outputs of said first antenna pair to produce a first signal, means for rotating one of said disks in response to said first signal, second means for combining the outputs of said second antenna pair to produce a second signal, means for rotating the other of said disks in response to said second signal, gyroscopes mounted on each of said disks and means providing an output which is a function of the angle between the planes of said disks.

6. In a missile homing system of the interferometer type which provides a pair of signals indicative of two direction cosines measured from missile reference axes to the missile target line of sight; a direction cosine linkage, comprising a pair of disks hinged together along a mutual diameter, means supporting said disks for movement relative to the missile airframe, a first and second pair of antennas, said first antenna pair lying in a first plane and forming a first reference axis, said second antenna pair lying in a second plane and forming a second reference axis, first means for combining the outputs of said first antenna pair to produce a signal indicative of the missile to target direction cosine measured from said first reference axis, second means for combining the outputs of said second antenna pair to produce a signal indicative of the missile to target direction cosine measured from said second reference axis, individual drive means for each of said disks, one of said drive means receiving one of the direction cosine signals and positioning one of said disks in accordance with said direction cosine, the other of said drive means receiving the other of the direction cosine signals and positioning the other of said disks in accordance with said other direction cosine, a gyroscope mounted on said one disk and providing an output indicating motion thereof, a second gyroscope mounted on said other disk and providing an output indicating motion thereof, and means receiving the outputs of said gyroscopes for computing steering signals for the missile.

7. Apparatus as claimed in claim 6 with additionally a first trigonometric function generator coupled to said one disk and providing an output to said computing means and a second trigonometric function generator coupled to said other disk and also providing an output to said computing means.

8. Apparatus as claimed in claim 7 with additionally a third trigonometric function generator coupled to both of said disks and supplying an output to said computing means which is a function of the angle between said disks.

No references cited.

SAMUEL FEINBERG, *Primary Examiner.*
CHESTER L. JUSTUS, *Examiner.*